US007628120B2

(12) United States Patent
Beeler

(10) Patent No.: US 7,628,120 B2
(45) Date of Patent: Dec. 8, 2009

(54) ANIMAL CARRIER ACCESSORY

(76) Inventor: William J. Beeler, 2500 Glenwood Pl., La Crosse, WI (US) 54601

( * ) Notice: Subject to any disclaimer, the term of this patent is extended or adjusted under 35 U.S.C. 154(b) by 0 days.

(21) Appl. No.: 12/319,315

(22) Filed: Jan. 6, 2009

(65) Prior Publication Data

US 2009/0114688 A1 May 7, 2009

Related U.S. Application Data

(63) Continuation of application No. 11/505,738, filed on Aug. 17, 2006, now abandoned.

(51) Int. Cl.
*A01K 1/00* (2006.01)
*A01K 1/02* (2006.01)
*A01K 31/00* (2006.01)
*A01K 1/03* (2006.01)
*B62J 7/00* (2006.01)
*B62J 9/00* (2006.01)
*B62J 11/00* (2006.01)

(52) U.S. Cl. .................. 119/496; 119/482; 119/499; 119/500; 224/413; 224/419

(58) Field of Classification Search ............. 119/496, 119/453, 482, 489, 497, 499, 500, 417, 418, 119/419, 420; 224/413, 419, 422, 423, 433
See application file for complete search history.

(56) References Cited

U.S. PATENT DOCUMENTS

| | | | | |
|---|---|---|---|---|
| 3,625,405 A | * | 12/1971 | Kezar et al. .................. | 224/413 |
| 4,010,880 A | * | 3/1977 | Guillot-Munoz ............ | 224/275 |
| 4,266,703 A | * | 5/1981 | Litz ........................... | 224/443 |
| 4,588,114 A | * | 5/1986 | Lebaron et al. ............. | 224/435 |
| 5,044,321 A | * | 9/1991 | Selph .......................... | 119/416 |
| 5,133,294 A | * | 7/1992 | Reid ........................... | 119/771 |
| 5,577,646 A | * | 11/1996 | White ......................... | 224/422 |
| 5,810,227 A | * | 9/1998 | Jorgensen .................... | 224/413 |
| 6,250,529 B1 | * | 6/2001 | Babbitt et al. ............... | 224/401 |
| 2004/0108160 A1 | * | 6/2004 | Sato et al. ................... | 180/312 |
| 2005/0217599 A1 | * | 10/2005 | Varner ......................... | 119/496 |

FOREIGN PATENT DOCUMENTS

FR    2698335    *    5/1994

* cited by examiner

*Primary Examiner*—Michael R Mansen
*Assistant Examiner*—Monica L Williams
(74) *Attorney, Agent, or Firm*—M. Paul Hendrickson

(57) ABSTRACT

An animal carrier for mounting above the rear wheel of a cycle such as a motorcycle may be obtained by converting a motorcycle luggage carrier to an animal carrier. The motorcycle carrier mounts and bottom section may be equipped with a detachable top section equipped with extended sidewalls ported with ventilating ports and roofed canopy to protect the transported animal from the elements.

9 Claims, 6 Drawing Sheets

ANIMAL CARRIER ACCESSORY

This application is a continuation application of U.S. patent application Ser. No. 11/505,738 entitled Animal Carrier Accessory filed on behalf of Willaim J. Beeler on Aug. 17, 2006, now abandoned and hereby incorporated by reference herein.

FIELD OF INVENTION

The present invention relates to an animal carrier and more particularly to a mountable animal carrier for cycles and the method of its use.

BACKGROUND OF THE INVENTION

The technological advances in providing a practical and effective animal transport for motorcyclist is relatively sparse. Child seats or chairs mounted above the rear wheel of a bicycle with restraining straps have been heretofore proposed (e.g. see U.S. Pat. No. 4,053,091 to Martelet, and U.S. Pat. No. 5,234,143 to Mahvi et al.). U.S. Design Patent 276,713 to Schacter discloses a tray-like pet carrier equipped with animal restraining straps for mounting onto a bicycle. Baskets, platforms and pouches serving as an animal carrier for mounting onto an automobile seat are disclosed in U.S. Pat. No. 4,010,880 to Guillot-Munoz, U.S. Pat. No. 5,133,294 to Reid, and U.S. Pat. No. 5,044,321 to Selph. Motorcycle mounted pet carriers are also disclosed in U.S. Pat. No. 5,810,227 to Jorgensen and U.S. Pat. No. 5,577,646 to White and in U.S. patent application Publication No. 2005/0217599A1 to Varner. French Patent 2698335 discloses a hinged case or box having two concentric, hollow ventilated transparent upwardly projecting hemispheres which provides ventilation and outside viewing for the animal. The heretofore proposed motorcycle animal carriers generally leave the animal's head unprotected or protruding from a transparent dome. The current animal carriers collectively fail to effectively shield or protect the animal against the hazards of motorcycling. Consequently, the transported unprotected animals are subject to unprotected injuries such as being hit by impacting objects and other common injuries associated with motorcycle accidents as well as those induced by inclement conditions such as heat stroke, hail, rain, sleet, snow, etc.

Motorcyclist take great pride in their motorcycles and accordingly equip their motorcycles with quality accessories which accentuate the beauty and craftsmanship of the motorcycle. Accessories for motorcycles are accordingly relatively expensive and designed to tastefully blend into the basic motorcycle design and function. In addition, the accessories should not detract from the balance, safety and efficacy of the motorcycle operation.

Motorcycles may be optionally equipped with a luggage carrier accessory which mounts above the rear wheel behind the motorcycle seat or passenger seat. These luggage carriersare usually painted so as to match the color of the motorcycle. These luggage carriers are typically equipped with a lower half or bottom section mounted to the cycle and a detachable or removable top section cover suitably equipped with hinges, latches and locks to hinge and protectively latch and lock the top section onto the bottom section.

There exists a need for a better animal carrier for motorcycles and particularly an animal carrier which would better protect the transported animal against the hazards of cycling. The present invention provides an animal carrier which, if desired, may rely, in part, upon existing motorcycle accessory equipment to provide a safe, attractive, effective and economical animal carrier for the cyclist.

SUMMARY OF THE INVENTION

The present invention provides an animal carrier suitable for mounting behind a cyclist seat such as behind the motorcycle seat and above the rear motorcycle wheel. The animal carrier is positioned so as to not adversely affect the operational stability and aerodynamics of the cycle. The animal carrier consists essentially of a lower section and a mating, detachable upper enclosure or canopied section equipped with ventilating ports to provide sufficient air to the animal during transport. Conventional luggage carriers, as currently used by motorcyclists, may be effectively modified so as to serve as animal carriers by adding sufficient head room for housing the animal and a ventilators to the luggage carrier cover design.

The animal carrier provides a protective housing which protects the transported animal against injury. Atypical of most conventional animal carriers for motorcyclist, the present animal carrier serves as a protective enclosure protecting the entire body of the animal. This is in contrast to the existing animal carriers which commonly allow an animal's head to unprotectively protrude from the transporting carrier or involve a design wherein the animal's protruding head projects into a transparent and heat absorbing ventilated sphere. The animal carrier of this invention provides a protective canopy supported by ventilating sidewalls which serve to effectively protect the transported animal from the cycling hazards such as those hazardous injuries caused by motorcycle accidents or weather related hazards such as those induced by heat (e.g. heat stroke) rain, snow, sleet, hail and the like.

DETAILED DESCRIPTION OF THE INVENTION

Figure 1:
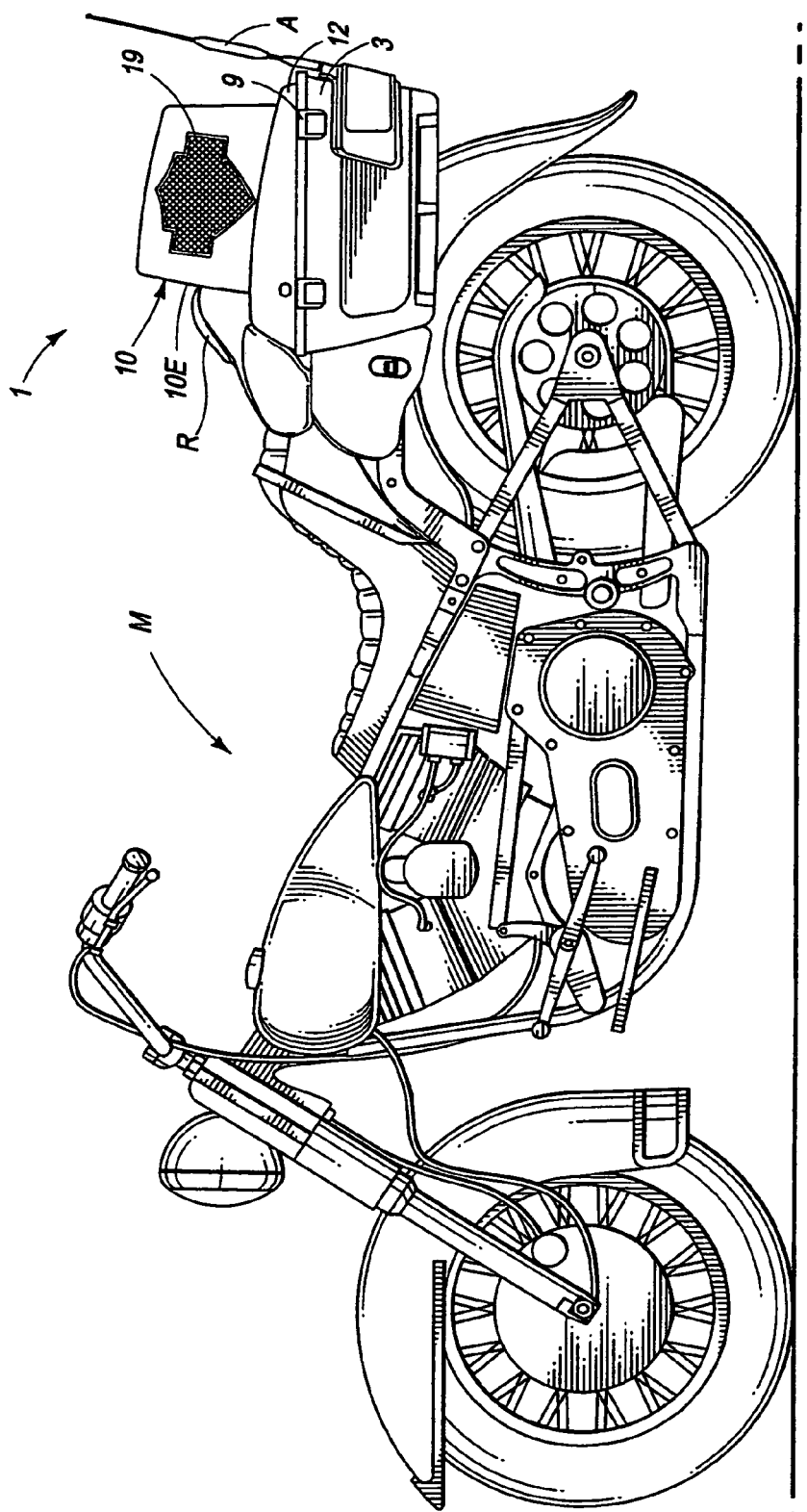
FIG. 1 is a side view of a motorcycle equipped with the animal carrier of this invention.
Figure 2:
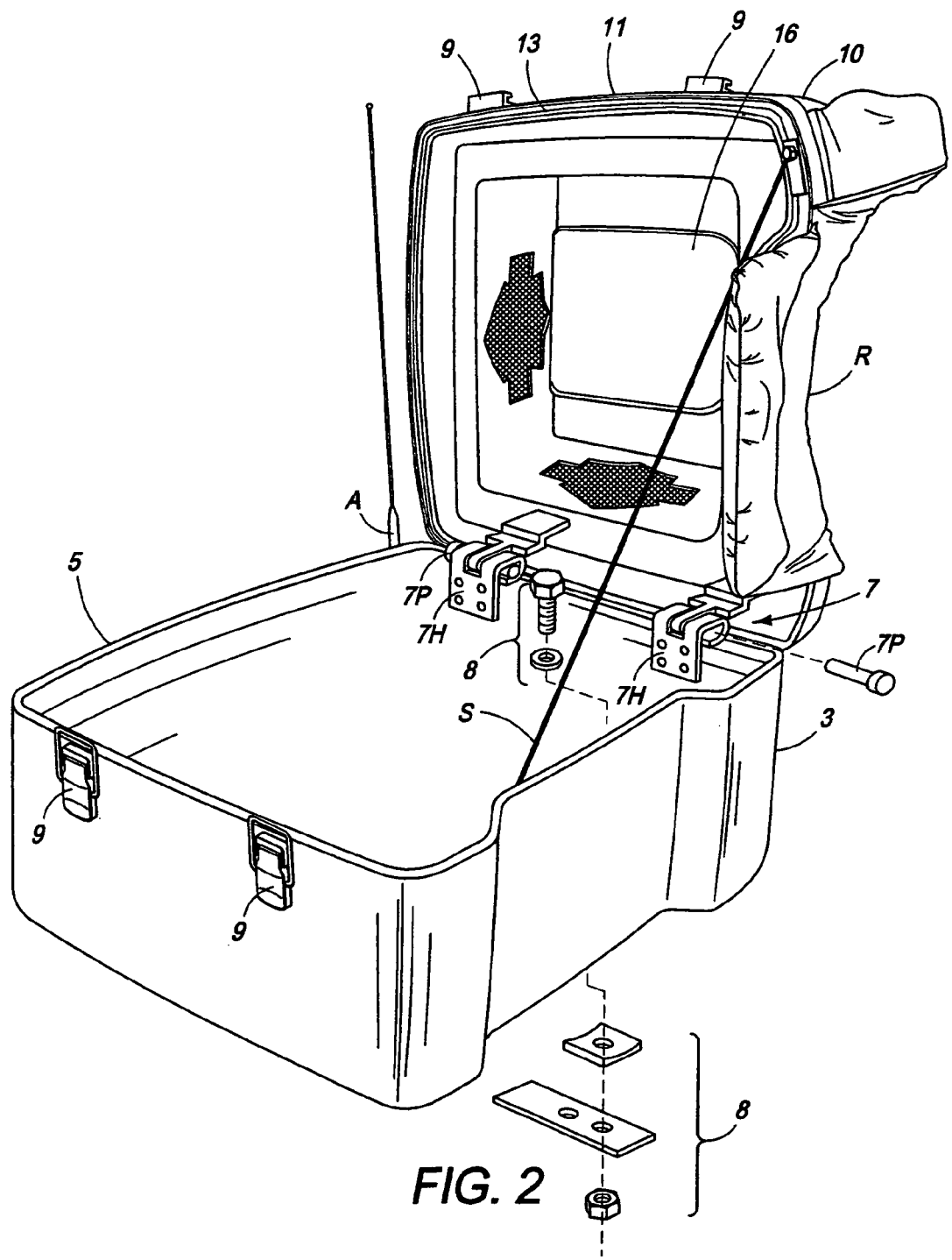
FIG. 2 is an elevational side view of the animal carrier shown in FIG. 1 with the carrier shown in the open position.
Figure 3:
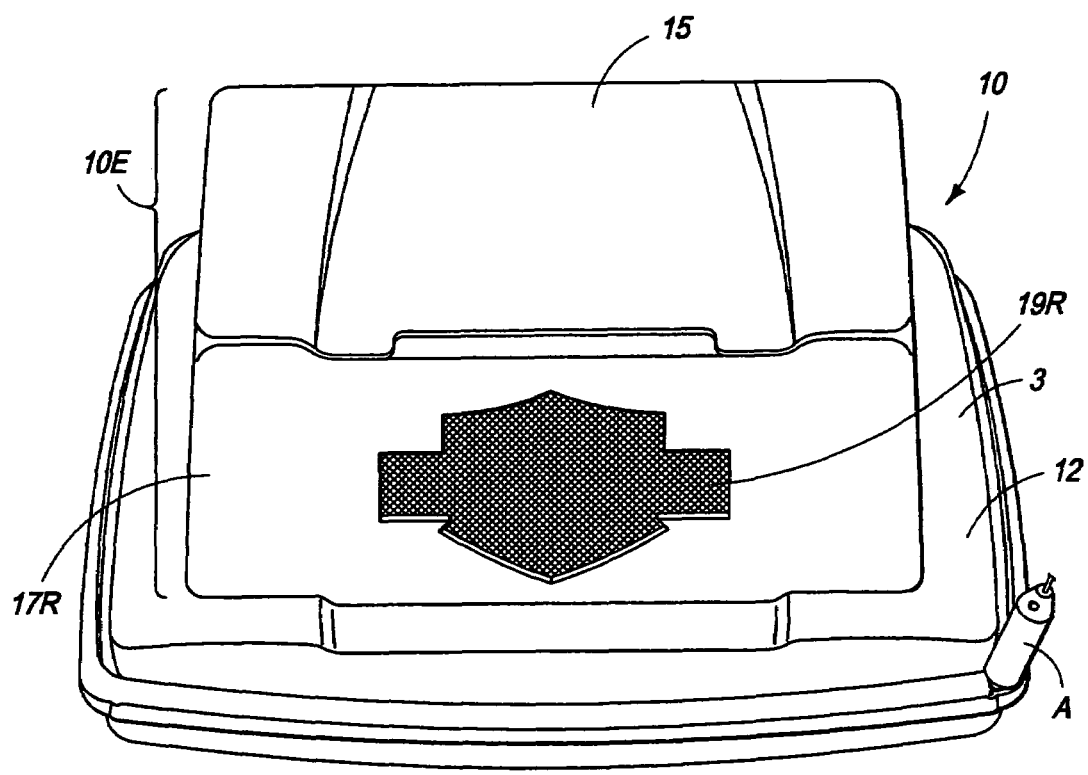
FIG. 3 is a rear view of the animal carrier shown in FIG. 1.

Referring to the Figures, the animal carrier 1 for housing a transported animals pursuant to the present invention comprises a base or bottom section 3 equipped with mounting members 8 for mounting the animal carrier 1 to the cycle M and a detachable top section 10 mounted or secured to the bottom section 3 so as to provide access for confining an animal within an internal chamber 4 housed within the top section 10 and the bottom section 3 of the animal carrier 1. The animal carrier 1 as depicted will suitably include a hinging member 7 which provides access to the animal confining chamber 4. The latching and locking members 9 as conventionally used to latch and lock a motorcycle luggage cover LC to a bottom luggage section 3 may be effectively used for this purpose. Access to the internal chamber 4 may be accomplished by a variety of accessing means such as equipping the bottom section 3 and the top section 10 with separable hinging and latching members 9 such as commonly available with current carriers LC. Such current carriers LC have latching and locking members 9 which dually serve to latch and lock a bottom luggage carrier section LB to a top luggage cover section LC. Such dual locking and latching members 9 permit for the locking to top cover LC and bottom luggage sections LB together.

Figure 7:
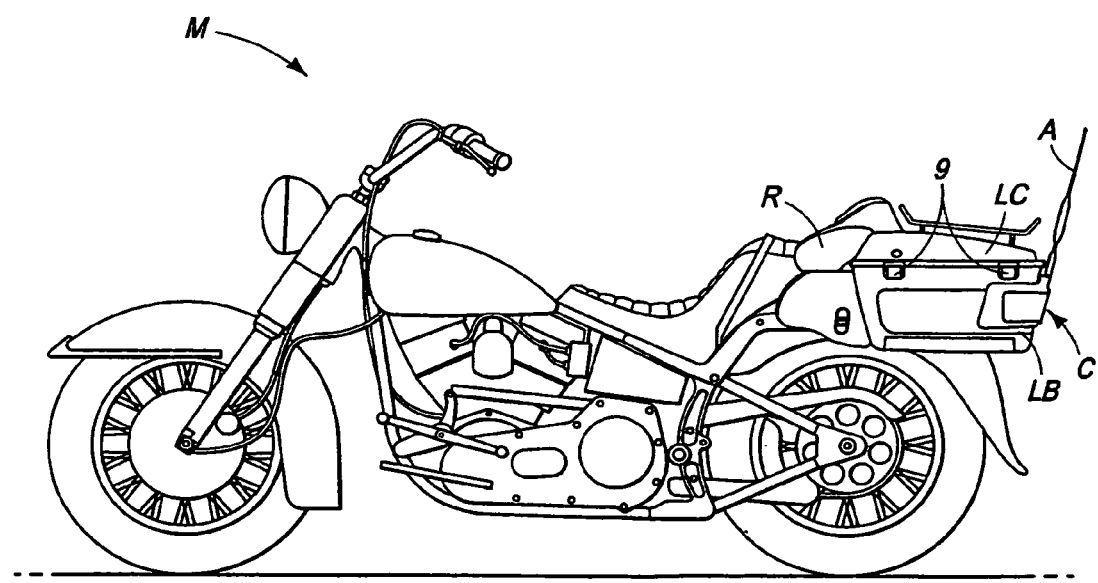
FIG. 7 is a prior art side view of a motorcycle mounted luggage carrier.
Figure 8:
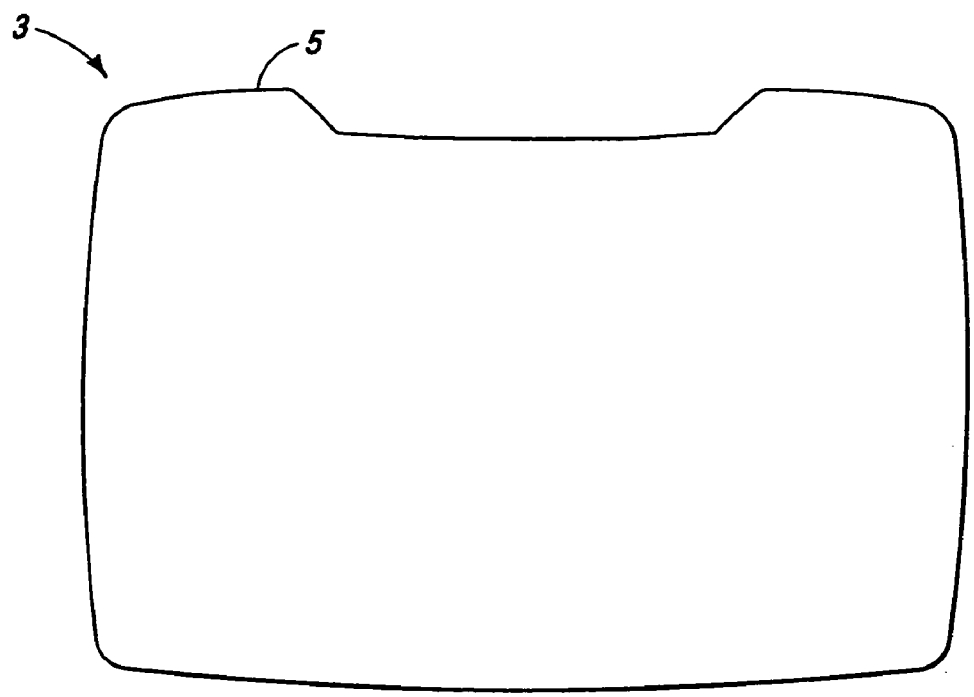
FIG. 8 depicts a top view of the bottom section of the animal carrier shown in FIG. 1.

In the more limited embodiments of the invention, the top section 10 is likewise hinged and separable or detachable from the bottom section 3 which allows the user to convert the animal carrier 1 to a luggage carrier LC of FIG. 7 simply by replacing the top section 10 with the luggage cover section LC. In addition to hinging latching and locking the top luggage cover LC to the bottom luggage compartment LB, most existing luggage carrier hinging and latching systems include a mechanism which allows for easy separation and removal of the top luggage carrier cover LC from the bottom luggage section LB. The detachable top section 10 embodiment of the animal carrier 1 may utilize the same hinging, latching, locking and detaching mechanism of the luggage carrier LC, thus permitting easy conversion of a luggage carrier C to an animal carrier 1 and vice versa. Thus, simply by removing hinge pins 7P, the luggage carrier cover LC may be replaced with the top section 10 by pinning the hinge pins 7P onto the mating upper hinge sections 7H of top section 10. An exemplary bottom luggage compartment LB and luggage carrier cover LC which may be optionally converted to an animal carrier 1 is a luggage box sold by Harley Davidson motorcycle company as a King Tour-Pak.

The top section 10 in cooperative combination with the bottom section 3 serves to protectively house the transported animal. The animal carrier 1 is sized to accommodate the transported animal in a safe transporting manner. The animal carrier 1 embodies a number of features which safely protect the animal against the cycling hazards of road travel. In the event an accident occurs, the animal carrier 1 serves to protectively retain and house the animal against injury.

With particular reference to the accompanying FIGS. 1-9, the present invention provides an animal carrier accessory 1 most appropriately adapted to serve as a replacement a motorcycle luggage carrier top section LC shown in FIG. 7 with an animal carrier top section 10 as shown in FIGS. 1-6 and 8-9. If desired, the animal carrier 1 may be appropriately manufactured as a compete accessory or unit for mounting onto a motorcycle M which complete accessory includes a bottom section 3, mounting members 8 for mounting the animal carrier 1 to a motorcycle M and a detachable top section 10 which matingly mounts onto the bottom section 3 as illustrated by FIGS. 1-6 and 8-9. Alternatively, the top section 10 may be manufactured as a separate accessory for matingly mounting onto a conventional mounted luggage bottom carrier LB which then serves as the mounted bottom section 3 and allows the motorcyclist to optionally use either the luggage carrier cover LC or the animal carrier top section 10.

Figure 6:
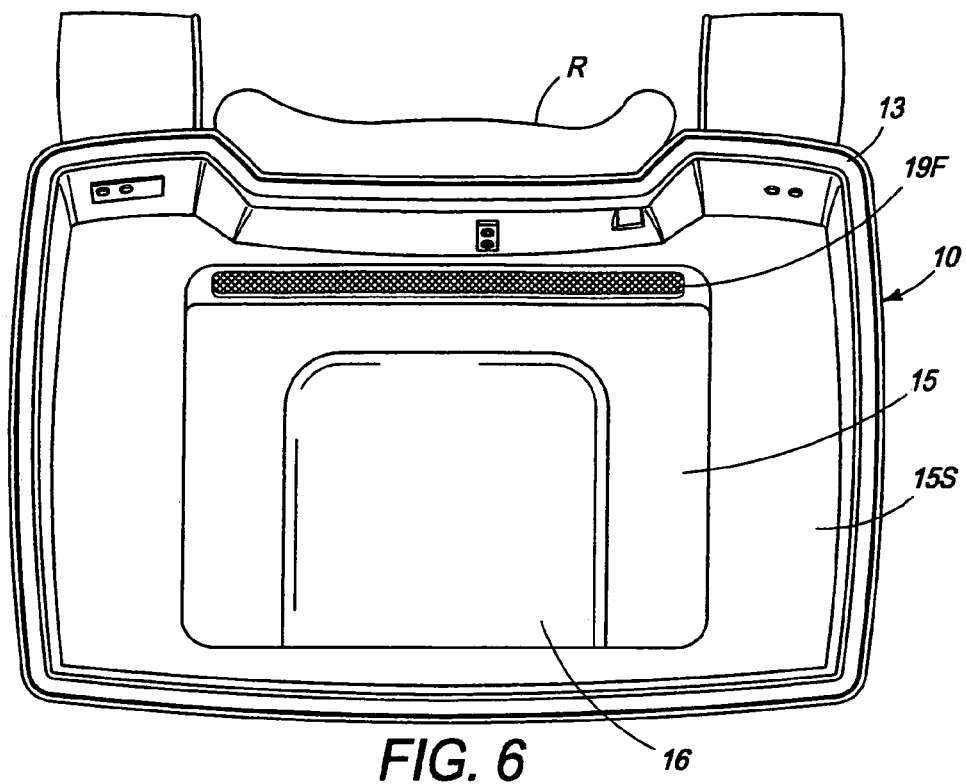
FIG. 6 is an elevational bottom view of a top section of the animal carrier shown in FIG. 1.

As may be observed from FIG. 6, conventional motorcycle luggage carriers C are unsuited for the transport of animals. However, the bottom section 3 and luggage carrier mounting members 8 of the luggage carrier system may be effectively utilized as a base for mounting the converted top section 10 thereto. This allows the motorcyclist the luxury of using the mounted bottom section 3 to either transport luggage or a pet animal simply by mounting the appropriate animal carrier top section 3 or luggage cover LC thereto. If desired, the top section 10 may be especially manufactured so as to specifically mate onto the configuration of the bottom section 3 and thereby provide the animal carrier 1 (as shown in FIG. 1) while allowing a separate luggage cover LC to be alternatively used when it is desired to transport luggage as illustrated by FIG. 7.

With particular reference to FIG. 7, a typical motor cycle luggage carrier comprises a lower luggage compartment LB equipped with hinged latches 9 which hinge and latch to luggage compartment cover LC to the lower luggage compartment. A typical motorcycle luggage lower carrier compartment for a popular motorcycle typically measures 13"× 17" at the base and rise about 18 inches high with the cover LC typically measuring only 3" in peak height. Such motorcycle luggage carriers C cannot be used to safely transport pet animals such as small pet dogs and cats.

In reference to FIGS. 1-9, it may be observed that a conventional luggage carrier cover LC for a conventional motorcycle luggage carrier C may be converted to a ventilated animal confining top section 10 by removing the covering canopy C and extending the top section sidewalls 17 sufficiently (e.g. about 6-15 inches) to permit a small pet to be housed therein. The extended sidewalls 17 are fitted with ventilating ports 19 and covered with an enclosing canopy roof 15 to protect the caged animal from the elements.

As may be observed from the Figures, the top section 10 suitably includes a contoured rim or lip 11 which matingly engages and overlaps onto the brim 5 of the bottom section 3. This protectively seals the animal carrier 1 against inclement elements such as rain, etc., from penetrating about and through the top section 10 mount to the bottom section 3 and into the internal chamber 4. A rubber or insulative seal 13 may be effectively utilized between the bottom section 3 and top section 10 interface further to protect the animal carrier 1 from vibrational wear and tear while also reducing vibrational noises between the bottom section 3 and the top section 10 interface thus creating an effective insulative seal therebetween.

The top section 10 is sized and configured so as to afford sufficient room for caging the transported animal. This requires sufficient elevation of the top section 10 roofline so as to allow for the housing of a small animal (e.g. less than 25-30 pounds) such as a pet dog or cat therewithin. In order to maintain the appropriate aerodynamic and operational balance of the transporting motorcycle, it is advantageous to limit the combined bottom section 3 and top section to an elevational height to less than 2 feet and most typically less than about 1½ feet. Similarly, undue width of the animal carrier 1 can likewise create an unbalance and excessive wind drag. Accordingly, the width is most appropriately not excessively greater than the motorcyclist's body width. For most applications, the width of the animal carrier 1 will be less than two feet and most typically less the about 1½ feet in width. The roofline includes a first tier roof 15S and a top canopy roof 15 which serves to stream line the air flow through and about the animal carrier 1 and thereby reduce wind drag.

Figure 4:
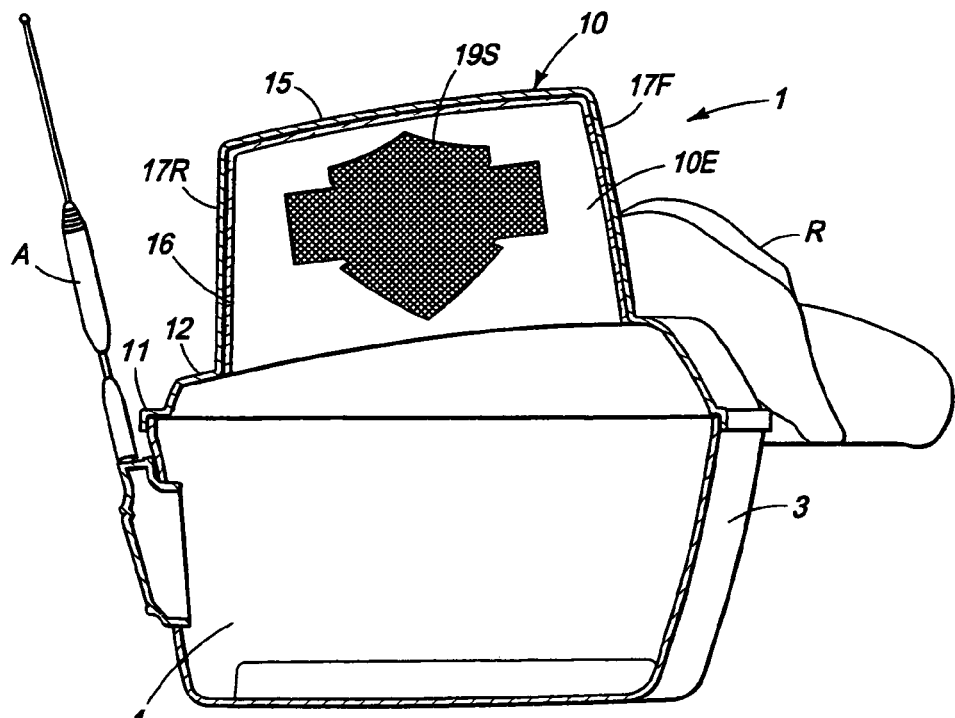
FIG. 4 is a longitudinal cross-sectional view of the animal carrier taken along line 4-4 of FIG. 1.
Figure 5:
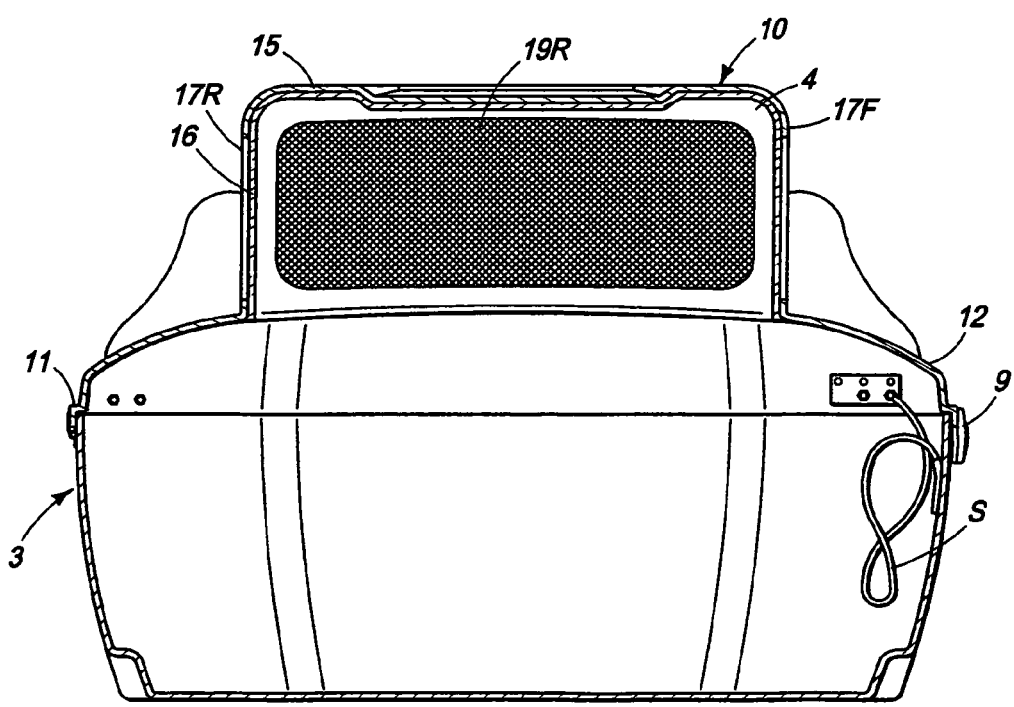
FIG. 5 is a transverse cross-sectional view of the animal carrier taken along line 5-5 of FIG. 3.

As may be observed from FIGS. 1-6 and 8-9, the top section 10 includes a protective canopy 15 supported by an enclosing walled or sidewall structure 17 (depicted as including a front wall 17F and a real wall 17R) equipped with adequate ventilation ports 19 to allow air currents to flow freely through the top section 10 while transporting the animal therewith. In order to protect the animal against excessive heat development with the housing chamber 4 by sunlight beating upon the canopy roof 15, an internal insulative roof liner 16 may be secured on the bottom internal side of the canopy 15 as depicted in FIGS. 4 and 5.

The top section 10 includes sufficient ventilating ports (generally referred to as 19) so as to provide sufficient ventilation to the transported animal. The animal carrier 1 depicted by the Figures embodies a desirable aerodynamic design which allows air currents to effectively move about and through the animal carrier 1 while transporting the animal. The depicted animal carrier 1 includes a front ventilating port 19F and a pair of side ventilating ports 19S which further serve to gather, distribute and vent air currents to the caged animal. The rear ventilating port 19R being of a larger size provides for effective discharge or venting of the ventilating air currents so as to allow for the admission of fresh air currents into the caged compartment without creating excessive drag. Although it is generally unnecessary, ventilating ports 19 may also be alternatively provided in the bottom section 3 of the animal carrier 1.

Figure 9:
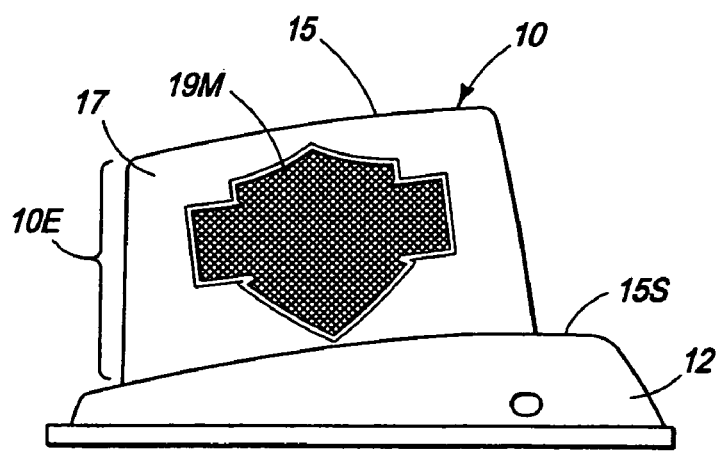
FIG. 9 is a side view of the animal carrier top section shown in FIG. 1.

The design and mounting position of the animal carrier 1 further reduces the effect of inclimate weather and wind drag upon the operational use of the motorcycle. The upwardly projected front wall 17F of the top section 10 as illustrated in FIGS. 1, 4, and 9 facilitates the aerodynamic flow of air currents about the animal carrier 1. In addition, the placement of the animal carrier 1 above the rear wheel and behind the passenger seat provides a protective shield for the caged animal while also reducing wind drag and instability of the vehicle during the transport of the caged animal.

The depicted animal carrier 1 is designed to transport a small animal such as a small dog (e.g. less than 20 pounds) and may be fabricated by relying upon the existing luggage carrier cover LC to provide certain desired top section 10 features (e.g. mounting, hinging, latching, locking, mating configuration, detachable, etc.) while also incorporating into the structure the necessary animal transport features. The appropriate mount for the top section 10 may be initiated by cutting a rectangular section from the luggage carrier cover LC to provide a top section base 12 and mounting the remaining prefabricated top section extension 10E onto cut out section of the top section base 12.

The construction of the top section extension 10E upon the top section base 12 may be of a mountable type using appropriate mounting means such as bolts, rivets, adhesives, glues, etc., to mount the top section 10 to the top section base 12. If desired, a mountable and detachable cover insert (not shown) to cover the rectangular cut in the top section base 12 may be utilized when it is desired to transport luggage and a detachable top section extension 10E for use in the transport of animals. From a motorcyclist aesthetic view point, a highly attractive animal carrier 1 may be accomplished by directly integrating the top section extension 10E onto the top section base 12 structure, typically by a fiber glass resin reconstruction of the luggage carrier cover LC. This may be accomplished by fabricating the necessary sidewalls 17 (e.g. depicted measuring 8" high) vented with the appropriate ventilating ports 19 protectively covered with a nylon or metal meshed screen 19M and roof 15 of the top section extension 10E. The top section extension 10E may be separately fabricated or fabricated directly onto the top section base 12 utilizing conventional fiberglass construction and coloring matching techniques to produce an aesthetically pleasing and functional animal carrier 1 transport.

The present invention further provides a method for providing an animal carrier 1 for a motorcycle M equipped with a luggage carrier bottom section 3 and a luggage carrier cover LC mounted with mounting member 8 onto a rear frame assembly of the motorcycle, said method comprising replacing the luggage carrier LC cover with a detachable animal caging top section 10 having a rim 11 of size and configuration so as to matingly engage onto a brim 5 of the luggage carrier bottom section 3, with said animal caging top section 10 including a projecting walled structure 17 terminated by a protective canopy 15 defining an animal confining chamber 4 of a size sufficient to house a caged animal therewithin, sufficient ventilating ports 19 venting the walled structure 17 so as to provide ventilation to the caged animal and hinging and latching members 7 to provide access for caging the animal therewith and the protectively latch the detachable animal caging top section thereto.

The figures also depict conventional motorcycle accessories such as an antenna (A), a rear seat back rest (R) and opening stop (S) which may be incorporated into the design of the animal carrier 1.

What is claimed is:

1. A protective animal carrier adopted for use in transporting a confined animal with a motorcycle, said carrier consisting essential of:
    A. a motorcycle luggage carrier bottom section of a motorcycle luggage carrier equipped with a contoured brim and a hinging member fitted with removable hinging pins and including a mount for mounting the bottom section above a rear wheel of the motorcycle; and
    B. an attachable and detachable animal carrier top section having an interfacing rim sized and configured to matingly interface and mount onto said contoured brim, ventilating sidewalls vertically extending upwardly from said rim and an enclosing roof so as to provide in combination with said bottom section a confining chamber for protectively housing the animal therewithin, while still permitting an aerodynamic ventilation throughout said chamber when said top section is operationally mounted onto said bottom section and used to transport the animal therewithin, with said ventilating sidewalls of said top section being ventilated by ventilating ports positioned within said sidewalls including a rear ventilating port of a larger ventilating size so as to allow for effective admission of fresh air currents and an aerodynamic discharge of ventilating currents from said confining chamber and a detachable mating hinging member which correspondingly mates onto the hinging member of the luggage bottom section for hinging the top section onto the bottom section with said hinging pins and thereby permit access to the confining chamber and a placement of the animal therewithin when the top section is hinged to an open position and providing the confining chamber when said top section is hinged to the closed position.

2. The animal carrier according to claim 1 wherein the sidewalls of said top section include sufficient screened ventilating ports positioned upon the sidewalls so as to allow fresh air currents to aerodynamically flow through the animal carrier top section accessory without creating excessive drag while transporting the animal therewithin.

3. The animal carrier according to claim 2 wherein the top section consists of a modified motorcycle luggage carrier cover modified with extended side walls of sufficient elevation so as to provide an elevated roofline of sufficient headroom to house a dog therewithin with said extended side walls being aerodynamically ventilated by screened ventilating ports within said side walls including a front ventilating port and a rear ventilating port of a larger ventilating size so as to allow for effective admission of fresh air currents and discharge of ventilating currents from the confining chamber.

4. A protective animal carrier for use in transporting an animal with a motorcycle, said carrier consisting essentially of a motorcycle luggage carrier bottom section of a motorcycle luggage carrier and a detachable animal confining top section detachably hinged onto the motorcycle luggage carrier bottom section wherein the bottom section includes mounts for mounting the bottom section above a rear motorcycle wheel, an interfacially engaging brim and a hinging member equipped with removable hinge pins which serves to hinge said top section to said bottom section, with said top section being equipped with correspondingly mating hinging members for hinging the animal carrier top section onto the hinging member of the motorcycle luggage carrier bottom section with said hinge pins and a mating interfacing rim sized and configured to matingly interface and mount onto said brim, ventilated sidewalls vertically extending upwardly from said rim with said sidewalls including a forward sidewall equipped with a front screened ventilating port, a rear sidewall equipped with a rear screened ventilating port of a larger ventilating size than said front screened ventilating port, two oppositely positioned sidewalls further equipped with screened side ventilating ports so as to collectively provide ventilating ports for an aerodynamic ventilation of the animal transported therewithin, an enclosing roof to shield the animal transported there within from inclimate elements and which roof in combination with said sidewalls and said bottom section provides a confining chamber for protectively housing the confined animal therewithin when said top section is hinged to a closed position, with access to the confining chamber being provided by hinging the top section to an open position and a detachment of the top section from the bottom section being effectuated by a removal of the hinge pins from the hinging member.

5. A method for converting a cycle luggage carrier into an animal transporting carrier combination which combination may be readily restored to the luggage carrier and vise versa wherein the cycle luggage carrier comprises a luggage carrier cover and a mounted luggage carrier bottom section having upwardly extending bottom section sidewalls terminated by an interfacing brim mounted above a rear wheel of a cycle with said bottom section further including a hinging member for coupling and uncoupling the cover therefrom and the cover is further characterized as having an interfacing rim for interfacially mounting and engaging onto the brim of the bottom section, and a mating detachable hinging member for coupling and detachably uncoupling the cover from the bottom section with said mating detachable hinging member when coupled onto said hinging member affording access to a luggage compartment confined therein by a hinging thereof to an open position, said method consisting essentially of:

a) providing an animal carrier top section accessory consisting essentially of a protective roof supported by vertical extending sidewalls sufficiently elevated so as to provide an animal confining chamber of sufficient size to house a transported animal therewithin, a contoured rim supportive of said sidewalls and contoured so as to matingly engage onto the brim of the luggage carrier bottom section, ventilating ports ported onto said vertically extending sidewalls so as to aerodynamically allow for effective admission and discharge of fresh air currents into and from the confining chamber without creating excessive drag during the transport of the transported animal therewithin and a detachable mating hinging section for hinging and coupling the accessory onto the hinging member of the bottom section;

b) uncoupling the mating detachable hinging member of the luggage carrier top cover from said luggage carrier bottom section so as to detach the luggage carrier cover from the bottom section;

c) mounting the rim of the animal carrier top section accessory onto the brim of the bottom section; and d) coupling the detachable mating hinging section of the animal carrier top section accessory onto the bottom section by hinging the mating hinging section of the accessory onto the mating hinging member of the bottom section so as to hinge and couple the accessory onto the bottom section and thereby provide the animal transporting carrier combination for housing the transported animal therewithin with said cycle.

6. The method according to claim 5 wherein the cycle luggage carrier consists of a motorcycle luggage carrier mounted above a rear wheel of a motorcycle and the method includes accessing onto the confining chamber by the hinging of the accessory to an open position, placing the transported animal within the bottom section, latching the accessory onto the bottom section and transporting the transported animal therewithin with the motorcycle.

7. the method according to claim 6 which includes the additional steps of removing the animal from the confining chamber, detaching the accessory from the bottom section by uncoupling the accessory therefrom and restoring the bottom section to serve as a luggage carrier by recoupling the cover onto said bottom section.

8. A method for converting a bottom section of a motorcycle luggage carrier into an animal transporting carrier combination wherein the motor cycle luggage carrier comprises a mounted motorcycle luggage carrier bottom section having vertically extending sidewalls terminated by an interfacing brim mounted above a rear wheel of a motorcycle and a detachable motorcycle luggage carrier cover equipped with an interfacing rim for interfacially mounting the cover onto said brim, with said bottom section and said cover being further equipped with mating hinging members and hinging pins hinging the cover onto the bottom section and thereby providing a hinged access to a luggage compartment housed within said luggage carrier and which hinging thereto upon removal of the hinging pins from the mating hinging members permits the luggage carrier top cover to be unhinged and detached from the bottom section, said method consisting essentially of:

a) providing an animal carrier top section accessory consisting essentially of a protective roof for shielding a transported animal from inclimate elements with said roof being supported by vertically extending ventilated sidewalls extending sufficiently upwardly so as to provide an animal confining chamber of sufficient size to house a transported animal therewithin when said accessory is mounted onto said bottom section, a contoured rim supportive of said sidewalls and contoured so as to matingly engage and mount onto the brim of the luggage carrier bottom section, ventilating ports ported onto the vertically extending ventilated sidewalls so as to aerodynamically allow for effective admission and discharge of fresh air currents into and from the confining chamber without creating excessive drag during the transport of the transported animal therewithin, and a correspondingly detachable mating hinging member to the hinging member of the bottom section so as to permit the coupling thereto and uncoupling thereof with said hinging pins;

b) detaching the luggage carrier top cover from said luggage carrier bottom section by removing the hinging pins from the mating hinging members to uncouple the mating hinging members of the cover from the bottom section;

c) mounting the rim of the animal carrier top section accessory onto the brim of the bottom section;

d) coupling the correspondingly mating hinging member of the animal carrier top section accessory onto the hinging member of the bottom section with said hinging pins so as to provide the animal transporting carrier for protectively housing the transported animal therewithin;

e) accessing onto the confining chamber of the animal transporting carrier by positioning the accessory to an open accessory position so as to provide access for placing the transported animal therewithin;

f) placing the transported animal within the bottom section; and g) securing the top section accessory onto the bottom section to a closed position so as to thereby provide the animal transporting carrier combination for protectively housing the transported animal by said motorcycle.

9. The method according to claim 8 which includes the additional steps of detaching the accessory from the bottom section and re-coupling the mating detachable hinging members of the cover to the hinging member of the bottom section so as to thereby provide a cycle luggage carrier for said motorcycle.

* * * * *